(12) United States Patent
Shogenji et al.

(10) Patent No.: US 10,450,982 B2
(45) Date of Patent: Oct. 22, 2019

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Yoshiyuki Shogenji, Toyota (JP); Keiichi Myojo, Okazaki (JP); Misako Ban, Toyota (JP); Yuki Nose, Kasugai (JP); Eiji Ikuta, Obu (JP); Norihito Hanai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 10 days.

(21) Appl. No.: 15/953,760

(22) Filed: Apr. 16, 2018

(65) Prior Publication Data
US 2018/0313287 A1     Nov. 1, 2018

(30) Foreign Application Priority Data

Apr. 28, 2017   (JP) ................. 2017-089540

(51) Int. Cl.
| | |
|---|---|
| *F02D 41/14* | (2006.01) |
| *F02P 5/152* | (2006.01) |
| *F02D 41/00* | (2006.01) |
| *F02D 41/24* | (2006.01) |
| *F02N 9/00* | (2006.01) |
| *F02D 35/02* | (2006.01) |

(52) U.S. Cl.
CPC ..... *F02D 41/1498* (2013.01); *F02D 41/0082* (2013.01); *F02D 41/2448* (2013.01); *F02N 9/00* (2013.01); *F02P 5/152* (2013.01); *F02D 35/027* (2013.01); *F02D 41/008* (2013.01); *F02D 41/2451* (2013.01); *F02P 5/1523* (2013.01)

(58) Field of Classification Search
CPC ... F02D 41/1498; F02D 41/0082; F02P 5/152
See application file for complete search history.

(56) References Cited

U.S. PATENT DOCUMENTS

| | | | |
|---|---|---|---|
| 6,250,074 B1 | 6/2001 | Suzuki et al. | |
| 2016/0061138 A1 | 3/2016 | Morihiro | |

FOREIGN PATENT DOCUMENTS

| | | |
|---|---|---|
| JP | 2000-320371 A | 11/2000 |
| JP | 2004-218541 A | 8/2004 |
| JP | 2013-057271 A | 3/2013 |
| JP | 2016-053304 A | 4/2016 |

*Primary Examiner* — Xiao En Mo
(74) *Attorney, Agent, or Firm* — Oliff PLC (57) ABSTRACT

A control device for an internal combustion engine includes an electronic control unit configured to determine whether or not cylinder-specific air-fuel ratio processing is being executed in which an air-fuel ratio of at least one of a plurality of cylinders is controlled to be a rich air-fuel ratio and an air-fuel ratio of at least one of the other cylinders is controlled to be a lean air-fuel ratio. The electronic control unit updates a first learning value in which a result of comparison between a knock strength of the internal combustion engine and a first determination value is reflected when the cylinder-specific air-fuel ratio processing is not being executed. The electronic control unit prohibits updating of the first learning value and calculates a target ignition timing of the internal combustion engine based on the first learning value when the cylinder-specific air-fuel ratio processing is being executed.

5 Claims, 5 Drawing Sheets

CONTROL DEVICE FOR INTERNAL COMBUSTION ENGINE

INCORPORATION BY REFERENCE

The disclosure of Japanese Patent Application No. 2017-089540 filed on Apr. 28, 2017 including the specification, drawings and abstract is incorporated herein by reference in its entirety.

BACKGROUND

1. Technical Field

The present disclosure relates to a control device for an internal combustion engine.

2. Description of Related Art

A plurality of cylinders of an internal combustion engine is controlled to have substantially the same air-fuel ratios in accordance with the operation state of the internal combustion engine. Known in contrast to the above is cylinder-specific air-fuel ratio processing in which the air-fuel ratio of one of the cylinders of the internal combustion engine is controlled to be a rich air-fuel ratio and the air-fuel ratio of each of the other cylinders is controlled to be a lean air-fuel ratio so that, for example, the temperature of a catalyst is raised (refer to, for example, Japanese Unexamined Patent Application Publication No. 2000-320371 (JP 2000-320371 A)).

It is known that the knocking occurrence situation, output torque, and so on of the internal combustion engine change in accordance with the ignition timing of the internal combustion engine. Accordingly, during ignition timing control, a target ignition timing that allows the output torque of the internal combustion engine to be maintained and the occurrence of knocking to be suppressed at the same time is calculated and control is performed such that the actual ignition timing corresponds to the target ignition timing. The target ignition timing is calculated based on a learning value in which the result of comparison between the knock strength of the internal combustion engine and a determination value is reflected. The learning value is updated every time the knock strength and the determination value are compared to each other under a predetermined condition so that the result of the comparison is reflected.

SUMMARY

As described above, the cylinders are controlled to have substantially the same air-fuel ratios in a normal operation state where the cylinder-specific air-fuel ratio processing is stopped. Accordingly, the knocking occurrence situation and the output torque in a state where the cylinder-specific air-fuel ratio processing is executed differ from the knocking occurrence situation and the output torque in the normal operation state. Therefore, in a case where the learning value described above is updated during the execution of the cylinder-specific air-fuel ratio processing and a return to the normal operation state is performed by the cylinder-specific air-fuel ratio processing being stopped subsequently, for example, the target ignition timing immediately after the return is calculated based on the learning value that is updated during the execution of the cylinder-specific air-fuel ratio processing. Therefore, the target ignition timing that is calculated immediately after the return to the normal operation state is not suitable for the normal operation state, and thus knocking may occur or maintaining of the output torque of the internal combustion engine may be impossible.

The disclosure provides a control device for an internal combustion engine that is capable of maintaining the output torque of the internal combustion engine while suppressing the occurrence of knocking immediately after a return to a normal operation state after stopping of cylinder-specific air-fuel ratio processing.

A first aspect of the disclosure relates to a control device for an internal combustion engine. The control device includes an electronic control unit configured to determine whether or not cylinder-specific air-fuel ratio processing is being executed in which an air-fuel ratio of at least one of a plurality of cylinders of the internal combustion engine is controlled to be a rich air-fuel ratio lower than a stoichiometric air-fuel ratio and an air-fuel ratio of at least one of the other cylinders is controlled to be a lean air-fuel ratio higher than the stoichiometric air-fuel ratio. A first learning value in which a result of comparison between a knock strength of the internal combustion engine and a first determination value is reflected is updated in a case where the electronic control unit determines that the cylinder-specific air-fuel ratio processing is not being executed. Updating of the first learning value is prohibited and a target ignition timing of the internal combustion engine is calculated based on the first learning value in a case where the electronic control unit determines that the cylinder-specific air-fuel ratio processing is executed.

According to the configuration described above, the first learning value is updated in a case where the cylinder-specific air-fuel ratio processing is stopped and updating of the first learning value is prohibited in a case where the cylinder-specific air-fuel ratio processing is being executed. Accordingly, even immediately after a return from a state where the cylinder-specific air-fuel ratio processing is executed to a normal operation state where the cylinder-specific air-fuel ratio processing is stopped, the target ignition timing is calculated based on the first learning value updated during the stop of the cylinder-specific air-fuel ratio processing. Since the target ignition timing suitable for the normal operation state is calculated immediately after a return to the normal operation state as described above, the output torque of the internal combustion engine can be maintained and the occurrence of knocking can be suppressed at the same time.

In the control device according to the first aspect of the disclosure, a second learning value in which a result of comparison between the knock strength of the internal combustion engine and a second determination value is reflected may be updated in the case where the electronic control unit determines that the cylinder-specific air-fuel ratio processing is being executed and the target ignition timing of the internal combustion engine may be calculated based on the second learning value in the case where the electronic control unit determines that the cylinder-specific air-fuel ratio processing is being executed.

According to the configuration described above, the target ignition timing is calculated based on the second learning value updated during the execution of the cylinder-specific air-fuel ratio processing during the execution of the cylinder-specific air-fuel ratio processing, and thus the output torque of the internal combustion engine can be maintained and the occurrence of knocking can be suppressed at the same time even during the execution of the cylinder-specific air-fuel ratio processing.

In the control device according to the first aspect of the disclosure, the electronic control unit may determine whether or not a period scheduled for continuation of the execution of the cylinder-specific air-fuel ratio processing is shorter than a predetermined period in the case where the electronic control unit determines that the cylinder-specific air-fuel ratio processing is being executed, the electronic control unit may prohibit updating of the second learning value in a case where the electronic control unit determines that the period scheduled for the continuation of the execution of the cylinder-specific air-fuel ratio processing is shorter than the predetermined period, and the electronic control unit may update the second learning value in a case where the electronic control unit determines that the cylinder-specific air-fuel ratio processing is being executed and determines that the period scheduled for the continuation of the execution of the cylinder-specific air-fuel ratio processing is not shorter than the predetermined period.

According to the configuration described above, during the execution of the cylinder-specific air-fuel ratio processing that has a relatively short duration of execution, the second learning value is not updated and the target ignition timing is calculated based on the non-updated second learning value. Since the duration of the cylinder-specific air-fuel ratio processing is relatively short, the output torque and knocking are rarely affected and the processing load for updating the second learning value can be reduced despite the calculation of the target ignition timing based on the non-updated second learning value.

In the control device according to the first aspect of the disclosure, the electronic control unit may calculate the target ignition timing based on a learning value updated in a case where the period scheduled for the continuation of the execution of the cylinder-specific air-fuel ratio processing is longer than the predetermined period in the case where the electronic control unit determines that the period scheduled for the continuation of the execution of the cylinder-specific air-fuel ratio processing is shorter than the predetermined period.

A second aspect of the disclosure relates to a control device for an internal combustion engine. The control device includes an electronic control unit configured to determine whether or not cylinder-specific air-fuel ratio processing is being executed in which an air-fuel ratio of at least one of a plurality of cylinders of the internal combustion engine is controlled to be a rich air-fuel ratio lower than a stoichiometric air-fuel ratio and an air-fuel ratio of at least one of the other cylinders is controlled to be a lean air-fuel ratio higher than the stoichiometric air-fuel ratio. A first learning value in which a result of comparison between a knock strength of the internal combustion engine and a first determination value is reflected is updated in a case where the electronic control unit determines that the cylinder-specific air-fuel ratio processing is not being executed. A second learning value in which a result of comparison between the knock strength of the internal combustion engine and a second determination value is reflected is updated in a case where the electronic control unit determines that the cylinder-specific air-fuel ratio processing is being executed. A target ignition timing of the internal combustion engine is calculated based on the second learning value in the case where the electronic control unit determines that the cylinder-specific air-fuel ratio processing is being executed.

According to the aspects of the disclosure, a control device for an internal combustion engine can be provided that is capable of maintaining the output torque of the internal combustion engine while suppressing the occurrence of knocking immediately after a return to a normal operation state after stopping of cylinder-specific air-fuel ratio processing.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, a plurality of examples will be described with reference to accompanying drawings.

Figure 1:
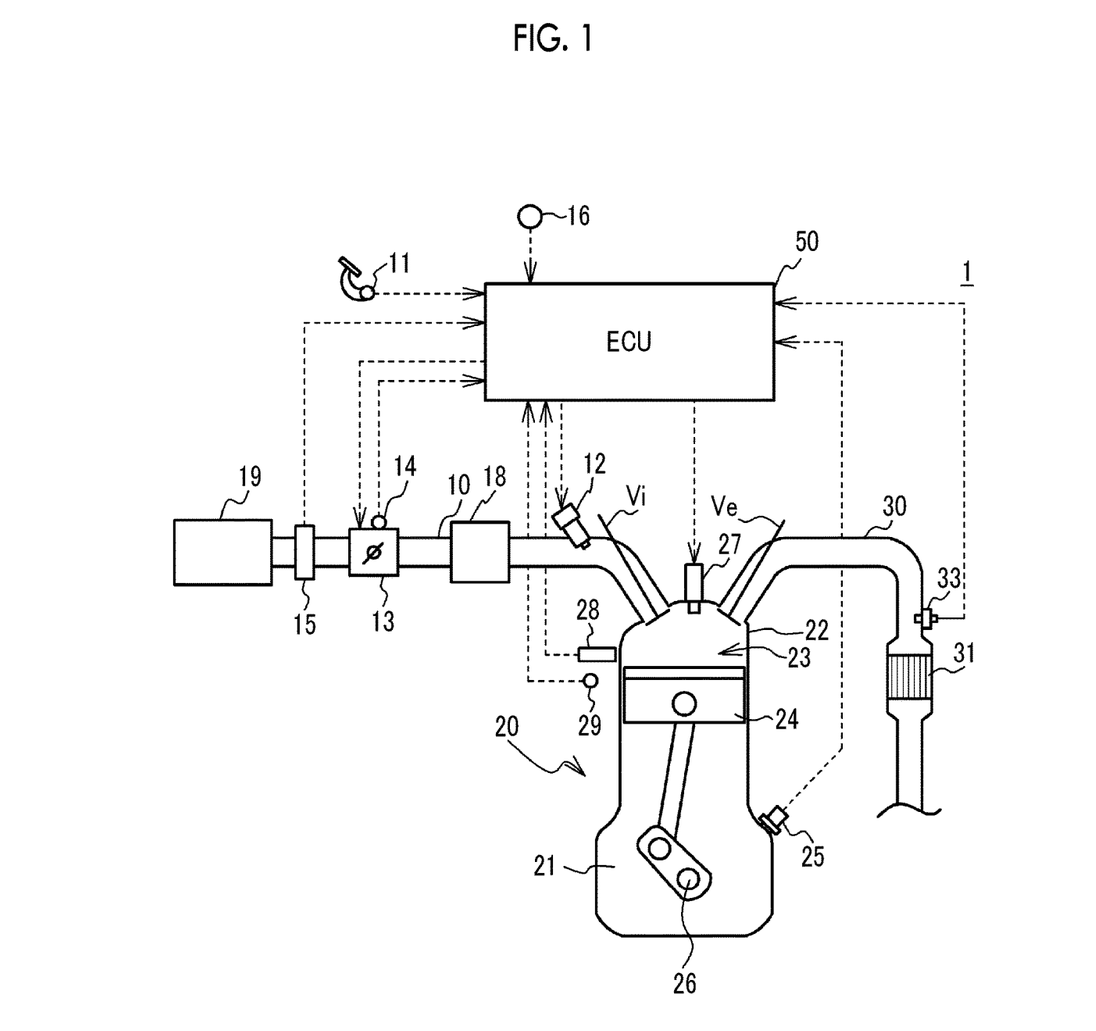
FIG. 1 is a schematic configuration diagram of the vicinity of an engine of a vehicle according to a first example.

FIG. 1 is a schematic configuration diagram of the vicinity of an engine 20 of a vehicle 1 according to a first example. In the engine 20, a piston 24 reciprocates as an air-fuel mixture is combusted in a combustion chamber 23 inside a cylinder head 22 installed in the upper portion of a cylinder block 21 storing the piston 24. The reciprocation of the piston 24 is converted into the rotational motion of a crankshaft 26. The engine 20 is an in-line four-cylinder engine. However, the engine 20 is not limited thereto insofar as it has a plurality of cylinders.

An intake valve Vi opening and closing an intake port and an exhaust valve Ve opening and closing an exhaust port are disposed for each cylinder in the cylinder head 22 of the engine 20. An ignition plug 27 for igniting the air-fuel mixture in the combustion chamber 23 is attached for each cylinder to the top portion of the cylinder head 22.

The intake port of each cylinder is connected to a surge tank 18 via a branch pipe for each cylinder. An intake pipe 10 is connected to the upstream side of the surge tank 18. An air cleaner 19 is disposed at the upstream end of the intake pipe 10. On the intake pipe 10, an air flow meter 15 for intake air amount detection and an electronically controlled throttle valve 13 are disposed in this order from the upstream side of the intake pipe 10.

A fuel injection valve 12 for fuel injection into the intake port is installed at the intake port of each cylinder. The fuel that is injected from the fuel injection valve 12 forms the air-fuel mixture by being mixed with intake air. The air-fuel mixture is suctioned into the combustion chamber 23 when the intake valve Vi is opened. Then, the air-fuel mixture is compressed by the piston 24, ignited by the ignition plug 27, and combusted. A fuel injection valve directly injecting a fuel into a cylinder may be disposed in place of the fuel injection valve 12 that injects the fuel into the intake port. Alternatively, both a fuel injection valve that injects a fuel into a cylinder and the fuel injection valve that injects the fuel into the intake port may be provided at the same time.

The exhaust port of each cylinder is connected to an exhaust pipe 30 via a branch pipe for each cylinder. A three-way catalyst 31 is disposed on the exhaust pipe 30. The three-way catalyst 31 has an oxygen storage capacity and removes NOx, HC, and CO. In the three-way catalyst 31, one or a plurality of catalyst layers including a catalyst carrier such as alumina and a catalyst metal carried on the catalyst carrier such as platinum, palladium, and rhodium is formed on a base material such as cordierite, a honeycomb substrate in particular. The three-way catalyst 31 is an example of a catalyst controlling the exhaust gas that is discharged from the cylinders of the engine 20. The three-way catalyst 31 may be an oxidation catalyst or a gasoline particulate filter coated with an oxidation catalyst.

An air-fuel ratio sensor 33 for detecting the air-fuel ratio of the exhaust gas is installed on the upstream side of the three-way catalyst 31. The air-fuel ratio sensor 33 is a so-called wide-area air-fuel ratio sensor capable of continuously detecting an air-fuel ratio over a relatively wide range. The air-fuel ratio sensor 33 outputs a signal of a value proportional to the air-fuel ratio.

The vehicle 1 is provided with an electronic control unit (ECU) 50. The ECU 50 is provided with a central processing unit (CPU), a random access memory (RAM), a read-only memory (ROM), a memory, and so on. The ECU 50 is an example of a control device that controls the engine 20 by executing a program stored in the ROM or the memory. The ECU 50 executes ignition timing control for maintaining the output torque of the internal combustion engine while suppressing the occurrence of knocking. The ignition timing control is realized by an execution determination unit, a first learning unit, a first prohibition unit, and a first calculation unit functionally realized by the CPU, the ROM, and the RAM of the ECU 50. Details thereof will be described later.

The ignition plug 27, the throttle valve 13, the fuel injection valve 12, and so on are electrically connected to the ECU 50. In addition, an accelerator operation amount sensor 11 for accelerator operation amount detection, a throttle opening degree sensor 14 detecting the throttle opening degree of the throttle valve 13, the air flow meter 15 for intake air amount detection, an ignition switch 16, the air-fuel ratio sensor 33, a crank angle sensor 25 detecting the crank angle of the crankshaft 26, a knock sensor 28 for detecting a knocking occurrence situation resulting from the combustion of the air-fuel mixture, a coolant temperature sensor 29 detecting the temperature of a coolant for the engine 20, and various other sensors are electrically connected to the ECU 50 via an A/D converter (not illustrated) and so on. The ECU 50 performs ignition timing control, fuel injection amount control, fuel injection ratio control, fuel injection timing control, throttle opening degree control, and so on and controls the ignition plug 27, the throttle valve 13, the fuel injection valve 12, and so on based on the values that are detected by the various sensors and the like so that a desired output is obtained.

Target air-fuel ratio setting by the ECU 50 will be described below. A target air-fuel ratio is set in accordance with the operation state of the engine 20 in a normal operation state where cylinder-specific air-fuel ratio processing (described later) is stopped. For example, a stoichiometric air-fuel ratio is set as the target air-fuel ratio when the operation state of the engine 20 is in a low-rotation and low-load region and the stoichiometric air-fuel ratio or a rich air-fuel ratio is set as the target air-fuel ratio when the operation state of the engine 20 is in a high-rotation and high-load region. Once the target air-fuel ratio is set, feedback control is performed on the amount of fuel injection into each cylinder such that the air-fuel ratio that is detected by the air-fuel ratio sensor 33 corresponds to the target air-fuel ratio.

The ECU 50 executes the cylinder-specific air-fuel ratio processing for the temperature of the three-way catalyst 31 to rise up to a predetermined temperature range. During the cylinder-specific air-fuel ratio processing, so-called dither control is executed in which the air-fuel ratio of at least one of the cylinders is controlled to be the rich air-fuel ratio lower than the stoichiometric air-fuel ratio and the air-fuel ratio of each of the other cylinders is controlled to be a lean air-fuel ratio higher than the stoichiometric air-fuel ratio. Specifically, the air-fuel ratio control during the cylinder-specific air-fuel ratio processing is to control the air-fuel ratio of one of the cylinders to be the rich air-fuel ratio by performing increase correction such that the air-fuel ratio exceeds the fuel injection amount corresponding to the target air-fuel ratio by a predetermined ratio and to control the air-fuel ratio of each of the other cylinders to be the lean air-fuel ratio by performing decrease correction such that the air-fuel ratio falls short of the fuel injection amount corresponding to the target air-fuel ratio by a predetermined ratio.

For example, the air-fuel ratio of one of the cylinders is controlled to be the rich air-fuel ratio by an increase correction of 15% with respect to the fuel injection amount corresponding to the target air-fuel ratio and the air-fuel ratio of each of the other three cylinders is controlled to be the lean air-fuel ratio by a decrease correction of 5% with respect to the fuel injection amount. Once the cylinder-specific air-fuel ratio processing is executed as described above, the surplus fuel that is discharged from the cylinder set to have the rich air-fuel ratio adheres to the three-way catalyst 31 and is combusted by the exhaust gas having the lean air-fuel ratio being supplied to the three-way catalyst 31. The temperature of the three-way catalyst 31 is raised as a result. The cylinder-specific air-fuel ratio processing is executed so that the control capacity of the three-way catalyst 31 is regenerated and the three-way catalyst 31 is warmed up during, for example, a cold start.

During the cylinder-specific air-fuel ratio processing, the average of the air-fuel ratios of all of the cylinders is set to be the stoichiometric air-fuel ratio. However, the average does not necessarily have to be the stoichiometric air-fuel ratio and the average may also be an air-fuel ratio within a predetermined range including the stoichiometric air-fuel ratio at which the temperature of the three-way catalyst 31 is capable of rising up to an activation temperature and a regeneration temperature. For example, the rich air-fuel ratio is set to a value ranging from 9 to 12 and the lean air-fuel ratio is set to a value ranging from 15 to 16. An air-fuel ratio of at least one of the cylinders may be set to be the rich air-fuel ratio with an air-fuel ratio of at least one of the other cylinders set to be the lean air-fuel ratio and air-fuel ratios of each of the remaining cylinders set to be the stoichiometric air-fuel ratio.

Figure 2:
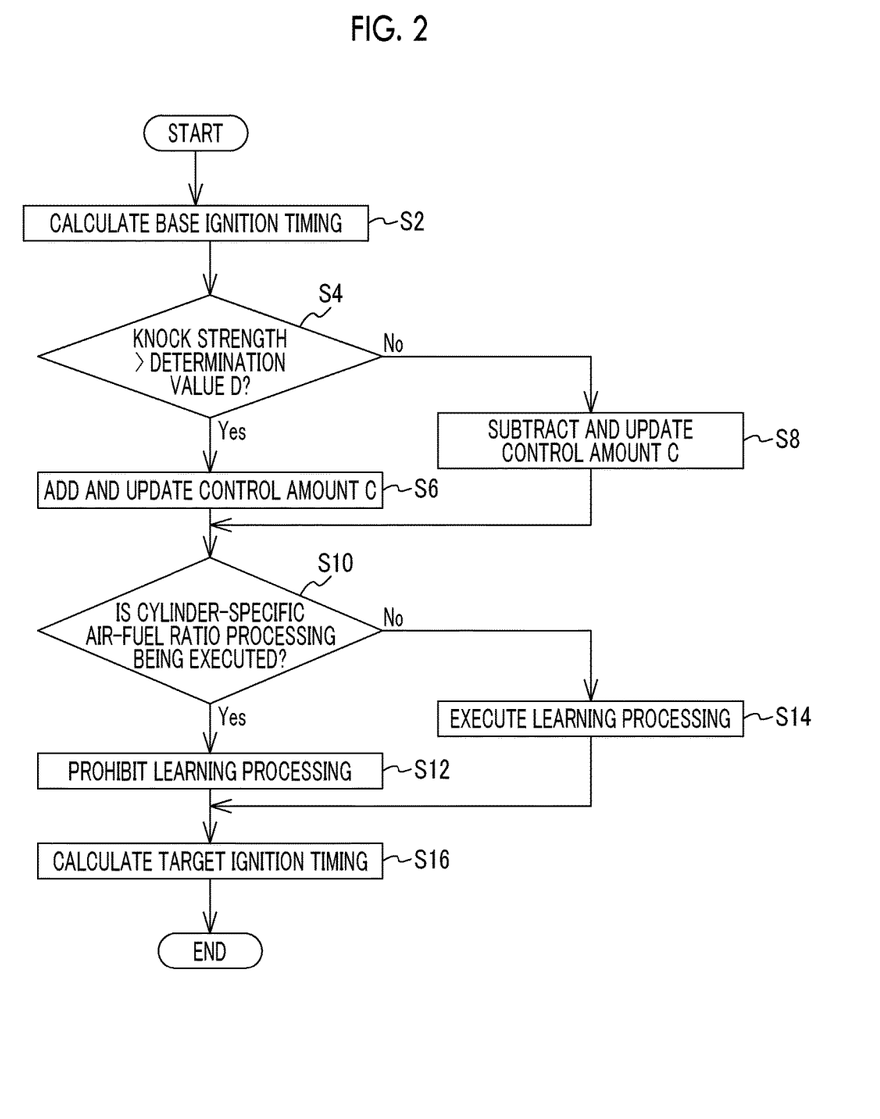
FIG. 2 is a flowchart illustrating ignition timing control according to the first example.

FIG. 2 is a flowchart illustrating the ignition timing control according to the first example. The flowchart illustrated in FIG. 2 is repeatedly executed at predetermined cycles by the ECU 50. Firstly, the ECU 50 calculates a base ignition timing as the base of target ignition timing calculation based on an engine rotation speed and an intake air amount (Step S2). Specifically, the ECU 50 calculates the base ignition timing by referring to a map in which the base ignition timing is defined in accordance with the engine rotation speed and the intake air amount. The map is acquired in advance by experiment and stored in the memory of the ECU 50. The engine rotation speed is detected by the crank angle sensor 25. The intake air amount is detected by the air flow meter 15. Set as the base ignition timing is one of two timings that is on the retard side, one of the two ignition timings being a limit ignition timing at which the occurrence of knocking can be suppressed (so-called knock limit) and the other one of the two ignition timings being an ignition timing at which the engine 20 has the best output torque and the best fuel consumption rate (so-called minimum advance for the best torque (MBT)).

The ECU 50 determines whether or not a knock strength exceeds a predetermined determination value D (Step S4). The knock strength shows the strength of the vibration of the knocking of the engine 20 that is detected by the knock sensor 28. The determination value D is a value with which the occurrence or non-occurrence of knocking in the engine 20 can be determined. The occurrence of knocking is determined in the case of a positive determination, and the non-occurrence of knocking is determined in the case of a negative determination. The knock strength is calculated based on the magnitude and waveform of a detection signal of the knock sensor 28 in a predetermined crank angle section having the possibility of knocking occurrence.

In the case of a positive determination in Step S4, a control amount C is added and updated by a predetermined value A1 (such as 0.4° CA) (Step S6). "° CA" represents a crank angle. In the case of a negative determination in Step S4, the control amount C is subtracted and updated by a predetermined value A2 (such as 0.01° CA) (Step S8). The control amount C is an amount with a magnitude changing in accordance with the current knocking occurrence situation of the engine 20. Specifically, the control amount C is changed such that the target ignition timing is on the retard side when the engine 20 knocks and the control amount C is set such that the target ignition timing is on the advance side when the engine 20 does not knock.

The ECU 50 determines whether or not the cylinder-specific air-fuel ratio processing is being executed (Step S10). Specifically, the ECU 50 makes the determination by referring to a cylinder-specific air-fuel ratio processing execution flag. The processing of Step S10 is an example of the processing that is executed by the execution determination unit determining whether or not the cylinder-specific air-fuel ratio processing is being executed in which the air-fuel ratio of at least one of the cylinders of the engine 20 is controlled to be the rich air-fuel ratio lower than the stoichiometric air-fuel ratio and the air-fuel ratio of at least one of the other cylinders is controlled to be the lean air-fuel ratio higher than the stoichiometric air-fuel ratio.

In the case of a positive determination in Step S10, the execution of learning processing (described later) is prohibited (Step S12). In other words, during the execution of the cylinder-specific air-fuel ratio processing, a learning value L (described later) is not updated regardless of the value of the control amount C and the learning value L remains updated immediately before the execution of the cylinder-specific air-fuel ratio processing. The processing of Step S12 is an example of the processing that is executed by the first prohibition unit prohibiting updating of the learning value L in the case of a positive determination in Step S10.

In the case of a negative determination in Step S10, the learning processing is executed (Step S14). Specifically, the learning value L is subtracted and updated by a predetermined value A5 (such as 0.5° CA) in a case where the control amount C exceeds a predetermined value A3 (such as 2.5° CA), the learning value L is not updated in a case where the control amount C is equal to or less than the predetermined value A3 and exceeds a predetermined value A4 (such as 0.5° CA), and the learning value L is added and updated by a predetermined value A6 (such as 0.5° CA) in a case where the control amount C is less than the predetermined value A4. As a result of the learning processing described above, the learning value L is updated to a relatively small value in a case where knocking tends to occur frequently and updated to a relatively large value in a case where the frequency of knocking occurrence is low. Accordingly, the result of comparison between the knock strength of the engine 20 and the determination value D is reflected in the learning value L. The processing of Step S14 is an example of the processing that is executed by the first learning unit updating the learning value L in which the result of comparison between the knock strength of the engine 20 and the determination value D is reflected in the case of a negative determination in Step S10.

Figure 3:
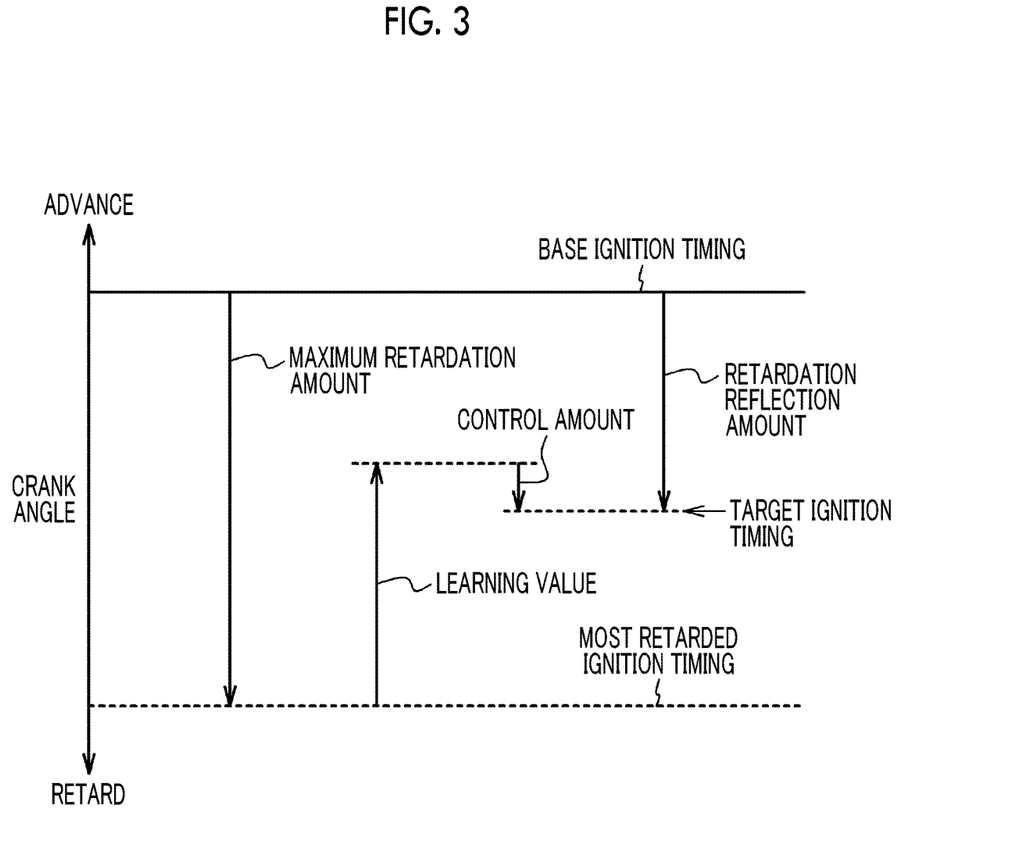
FIG. 3 is a diagram illustrating the relationship of various control values calculated during the ignition timing control.

The ECU 50 calculates the target ignition timing based on the control amount C and the learning value L (Step S16). Specifically, the ECU 50 calculates the target ignition timing as follows. The ECU 50 calculates the most retarded ignition timing by referring to a map in which the most retarded ignition timing as a retardation reflection amount control limit is defined in accordance with the engine rotation speed and an engine load. The map is acquired in advance by experiment and stored in the memory of the ECU 50. The most retarded ignition timing is the retard side limit value of the ignition timing range confirming for sure that no knocking occurs. The difference between the base ignition timing and the most retarded ignition timing is calculated as the maximum retardation amount. The maximum retardation amount is the retard side upper limit value of the target ignition timing with respect to the base ignition timing. The retardation reflection amount is calculated by the control amount C being added to the maximum retardation amount and the learning value L being subtracted from the maximum retardation amount. Subsequently, the target ignition timing is calculated by the retardation reflection amount being added to the base ignition timing. FIG. 3 is a diagram illustrating the relationship of the various control values that are calculated during the ignition timing control. The operation of the ignition plug 27 is controlled such that the target ignition timing calculated as described above and the ignition timing of the ignition plug 27 correspond to each other. The processing of Step S16 is an example of the processing that is executed by the calculation unit calculating the target ignition timing of the engine 20 based on the learning value L.

As described above, during the stop of the cylinder-specific air-fuel ratio processing, the target ignition timing is calculated based on the learning value L updated during the stop of the cylinder-specific air-fuel ratio processing although the target ignition timing is calculated based on the updated learning value L. Accordingly, immediately after a return to the normal operation state after the cylinder-specific air-fuel ratio processing is stopped, the target ignition timing is calculated based on the learning value L updated in the normal operation state preceding the execution of the cylinder-specific air-fuel ratio processing. Therefore, the target ignition timing that is suitable for the normal operation state is calculated even immediately after a return to the normal operation state, and the output torque of the engine 20 can be maintained and the occurrence of knocking can be suppressed at the same time.

The ignition timing control according to a second example will be described. In the ignition timing control according to the second example, the learning processing is executed even during the execution of the cylinder-specific air-fuel ratio processing unlike in the case of the first example described above. In the second example, the learning processing for updating the learning value L described above will be referred to as first learning processing and learning processing for updating a learning value La (described in detail later) will be referred to as second learning processing. The ignition timing control according to the second example is realized by an execution determination unit, first and second learning units, a first prohibition unit, and first and second calculation units functionally realized by the CPU, the ROM, and the RAM of the ECU 50. In the second example, the same reference numerals will be used to refer to the same processing as in the first example described above and redundant description will be omitted.

Figure 4:
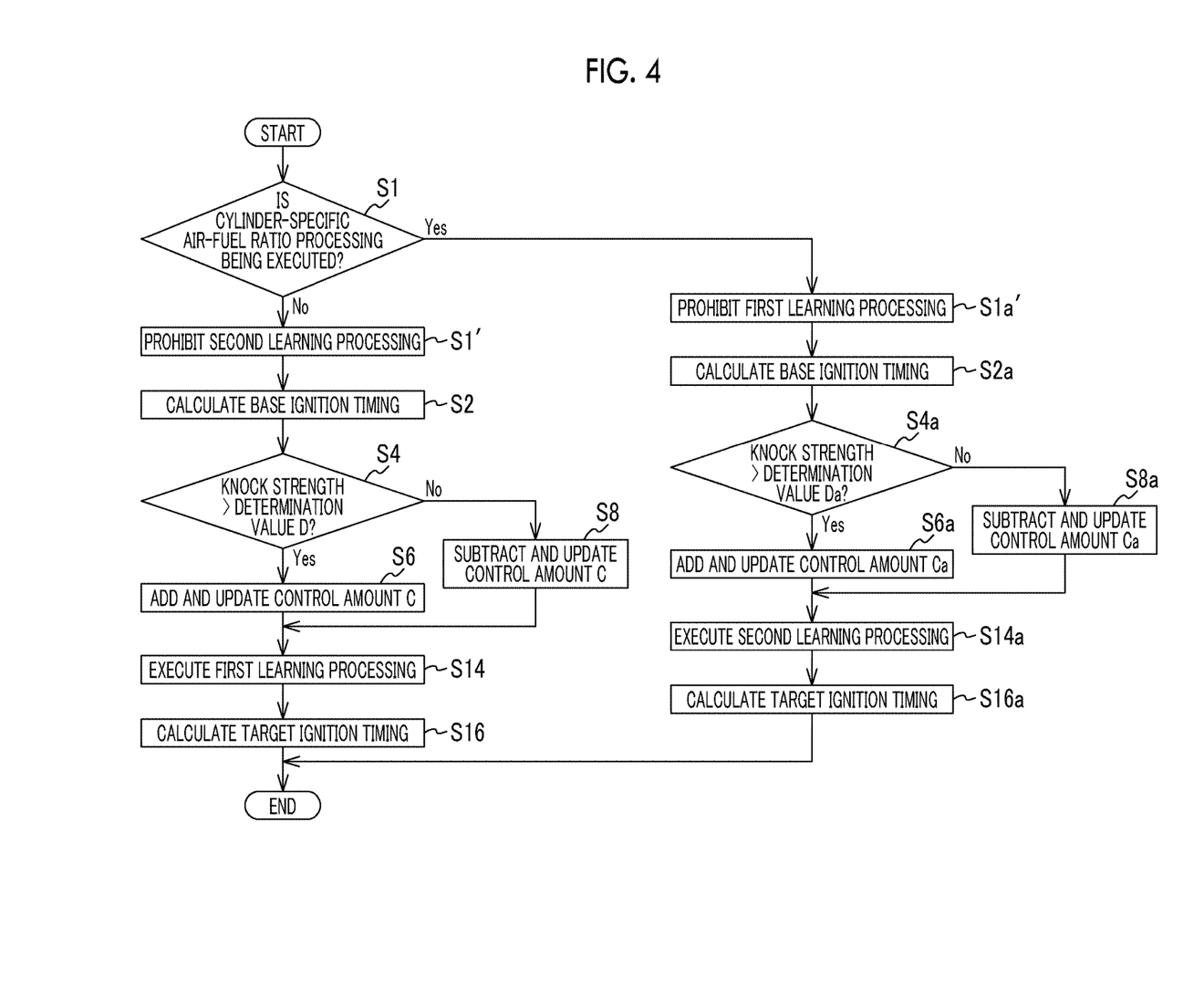
FIG. 4 is a flowchart illustrating ignition timing control according to a second example.

FIG. 4 is a flowchart illustrating the ignition timing control according to the second example. The flowchart illustrated in FIG. 4 is repeatedly executed at predetermined cycles by the ECU 50. Firstly, the ECU 50 determines whether or not the cylinder-specific air-fuel ratio processing is being executed (Step S1). Specifically, the ECU 50 makes the determination by a method similar to the method used in the processing of Step S10 according to the example described above. The processing of Step S1 is an example of the processing that is executed by the execution determination unit described above.

In the case of a negative determination in Step S1, the execution of the second learning processing (described later) is prohibited (Step S1'). Subsequently, Steps S2, S4, S6, or S8 is executed as in the first example described above, the first learning processing is executed (Step S14), and then the processing of Step S16 is executed in sequence. In this case, the processing of Steps S10 and S12 described above is not executed. The processing of Step S14 is an example of the processing that is executed by the first learning unit updating the learning value L in which the result of comparison between the knock strength of the engine 20 and the determination value D is reflected in the case of a negative determination in Step S1. The processing of Step S16 is an example of the processing that is executed by the first calculation unit calculating the target ignition timing of the engine 20 based on the learning value L.

In the case of a positive determination in Step S1, the execution of the first learning processing is prohibited (Step S1a'). In other words, in the first example, the processing of Step S1a' is an example of the processing that is executed by the first prohibition unit prohibiting updating of the learning value L. The ECU 50 calculates the base ignition timing (Step S2a). Although the specific calculation method is similar to the method used in Step S2 described above, the calculation of the base ignition timing in Step S2a is based on the learning value La updated by the learning processing during the execution of the cylinder-specific air-fuel ratio processing instead of the learning value L. Details thereof will be described later.

The ECU 50 determines whether or not the knock strength of the engine 20 exceeds a predetermined determination value Da (Step S4a). The determination value Da differs from the determination value D described above and is a value with which the occurrence or non-occurrence of knocking can be determined during the execution of the cylinder-specific air-fuel ratio processing.

In the case of a positive determination in Step S4a, a control amount Ca is added and updated by the predetermined value A1 (Step S6a). In the case of a negative determination in Step S4a, the control amount Ca is subtracted and updated by the predetermined value A2 (Step S8a). The control amount Ca is a value that differs from the control amount C described above. The control amount Ca is a value that is used for the calculation of the target ignition timing during the execution of the cylinder-specific air-fuel ratio processing.

The second learning processing is executed (Step S14a). Specifically, the learning value La is subtracted and updated by the predetermined value A5 in a case where the control amount Ca exceeds the predetermined value A3, the learning value La is not updated in a case where the control amount Ca is equal to or less than the predetermined value A3 and exceeds the predetermined value A4, and the learning value La is added and updated by the predetermined value A6 in a case where the control amount C is less than the predetermined value A4. As is the case with the control amount Ca, the learning value La is a value that is used for the calculation of the target ignition timing during the execution of the cylinder-specific air-fuel ratio processing. The processing of Step S14a is an example of the processing that is executed by the second learning unit updating the learning value La in which the result of comparison between the knock strength of the engine 20 and the determination value Da is reflected in the case of a positive determination in Step S1.

The ECU 50 calculates the target ignition timing based on the control amount Ca and the learning value La (Step S16a). The target ignition timing is calculated by the following method as in Step S16. The ECU 50 calculates the most retarded ignition timing in accordance with the engine rotation speed and the engine load. The difference between the base ignition timing and the most retarded ignition timing is calculated as the maximum retardation amount. The maximum retardation amount is the retard side upper limit value of the target ignition timing with respect to the base ignition timing. The retardation reflection amount is calculated by the control amount Ca being added to the maximum retardation amount and the learning value La being subtracted from the maximum retardation amount. Subsequently, the target ignition timing during the execution of the cylinder-specific air-fuel ratio processing is calculated by the retardation reflection amount being added to the base ignition timing. The processing of Step S16a is an example of the processing that is executed by the second calculation unit calculating the target ignition timing of the engine 20 based on the learning value La.

As described above, during the execution of the cylinder-specific air-fuel ratio processing, the target ignition timing is calculated based on the learning value La updated during the execution of the cylinder-specific air-fuel ratio processing instead of the learning value L updated during the stop of the cylinder-specific air-fuel ratio processing. Accordingly, the target ignition timing that is suitable for the cylinder-specific air-fuel ratio processing is calculated. Even immediately after the initiation of the cylinder-specific air-fuel ratio processing from the normal operation state, the target ignition timing is calculated based on the learning value La updated during the previous cylinder-specific air-fuel ratio processing. Therefore, even during the execution of the cylinder-specific air-fuel ratio processing, the output torque of the internal combustion engine can be maintained and the occurrence of knocking can be suppressed at the same time.

Even during the ignition timing control according to the second example, the target ignition timing is calculated based on the learning value L updated by the learning processing in the normal operation state in the normal operation state where the cylinder-specific air-fuel ratio processing is stopped. Accordingly, even immediately after a return to the normal operation state from the ongoing execution of the cylinder-specific air-fuel ratio processing, the target ignition timing that is suitable for the normal operation state is calculated based on the learning value L updated in the normal operation state preceding the execution of the cylinder-specific air-fuel ratio processing. Therefore, the output torque of the internal combustion engine can be maintained and the occurrence of knocking can be suppressed at the same time.

The ignition timing control according to a third example will be described. In the ignition timing control according to the third example, the learning processing may be executed or prohibited even during the execution of the cylinder-specific air-fuel ratio processing unlike in the first and second examples described above. The ignition timing control according to the third example is realized by an execution determination unit, a period determination unit, first and second learning units, first and second prohibition units, and first and second calculation units functionally realized by the CPU, the ROM, and the RAM of the ECU 50. In the third example, the same reference numerals will be used to refer to the same processing as in the first and second examples described above and redundant description will be omitted.

Figure 5:
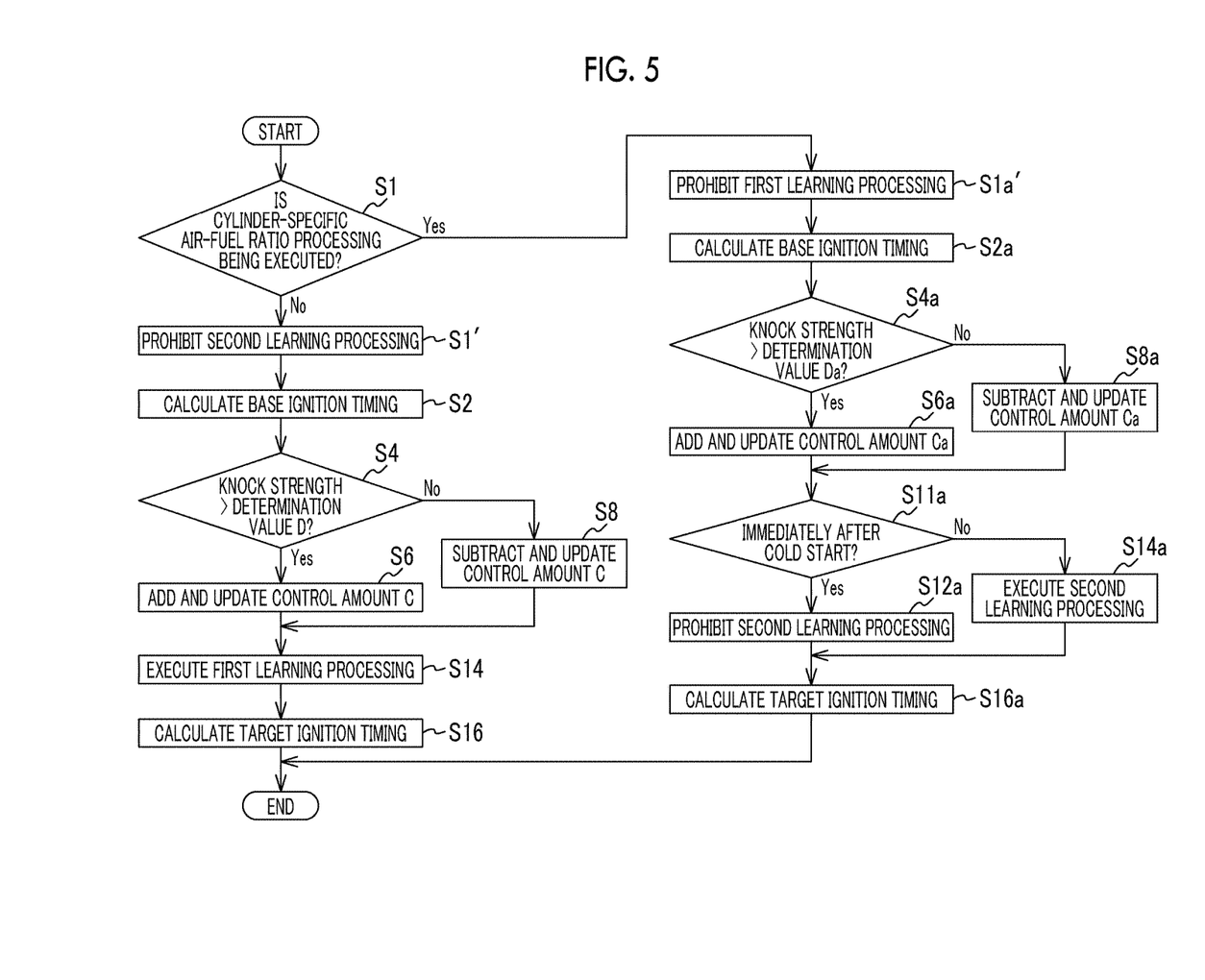
FIG. 5 is a flowchart illustrating ignition timing control according to a third example.

FIG. 5 is a flowchart illustrating the ignition timing control according to the third example. The flowchart illustrated in FIG. 5 is repeatedly executed at predetermined cycles by the ECU 50. In the case of a positive determination in Step S1, the processing of Steps S1a', S2a, S4a, S6a, or S8a is executed, and then the ECU 50 determines whether or not the state of the engine 20 is immediately after a cold start (Step S11a). Specifically, the ECU 50 determines that the state of the engine 20 is immediately after a cold start in a case where the temperature of the coolant detected by the coolant temperature sensor 29 is equal to or lower than a predetermined temperature and a predetermined period is yet to elapse after the engine 20 is started by the ignition switch 16 being turned ON. During the cold start of the engine 20, the cylinder-specific air-fuel ratio processing for warming up the three-way catalyst 31 is executed. The period during which the execution of the cylinder-specific air-fuel ratio processing for warming up the three-way catalyst 31 during the cold start continues is controlled to be shorter than the cylinder-specific air-fuel ratio processing for the regeneration of the three-way catalyst 31 described above. In a case where the purpose is the warm-up of the three-way catalyst 31, the temperature of the three-way catalyst 31 may be raised up to the activation temperature at which the control performance of the three-way catalyst 31 is activated. This is because the temperature of the three-way catalyst 31 needs to reach a temperature even higher than the activation temperature and be maintained for a relatively long period in the high-temperature state for the regeneration of the control performance of the three-way catalyst 31. For example, the duration of the cylinder-specific air-fuel ratio processing for the regeneration of the three-way catalyst 31 is approximately several minutes to tens of minutes whereas the duration of the cylinder-specific air-fuel ratio processing for warming up the three-way catalyst 31 during the cold start is approximately tens of seconds.

In the case of a positive determination in Step S11a, the ECU 50 is capable of determining that the period scheduled for the continuation of the execution of the cylinder-specific air-fuel ratio processing is a relatively short period. In the case of a negative determination in Step S11a, the ECU 50 is capable of determining that the scheduled duration of the cylinder-specific air-fuel ratio processing is a relatively long period. The processing of Step S11a may also be determined by a warm-up request flag requesting the warm-up of the three-way catalyst 31 being referred to. The processing of Step S11a is an example of the processing that is executed by the period determination unit determining whether or not the period scheduled for the continuation of the execution of the cylinder-specific air-fuel ratio processing is shorter than a predetermined period in the case of a positive determination in Step S1.

In the case of a positive determination in Step S11a, the second learning processing in which the learning value La is updated is prohibited (Step S12a). In other words, during the execution of the cylinder-specific air-fuel ratio processing that has a relatively short duration, the target ignition timing is calculated based on the learning value La updated during the execution of the cylinder-specific air-fuel ratio processing that has a relatively long duration (Step S16a). This is because the output torque and knocking are not significantly affected despite the non-execution of the learning processing in a case where the cylinder-specific air-fuel ratio processing continues merely for a short period. An increase in processing load resulting from the execution of the learning processing can be suppressed as well. The processing of Step S12a is an example of the processing that is executed by the second prohibition unit prohibiting updating of the learning value La in the case of a positive determination in Step S11a.

In the case of a negative determination in Step S11a, the learning value La is updated by the second learning processing being executed (Step S14a) and the target ignition timing is calculated (Step S16a). In other words, during the execution of the cylinder-specific air-fuel ratio processing that has a relatively long duration, the target ignition timing is calculated based on the learning value La updated during the execution of the cylinder-specific air-fuel ratio processing. The processing of Step S14a is an example of the processing that is executed by the second learning unit updating the learning value La in which the result of comparison between the knock strength of the engine 20 and the determination value Da is reflected in the case of a negative determination in Step S11a.

As described above, during the execution of the cylinder-specific air-fuel ratio processing that has a relatively short duration of execution, the learning value La is not updated and the target ignition timing is calculated based on the non-updated learning value La. Since the duration of the cylinder-specific air-fuel ratio processing is relatively short, the output torque and knocking are rarely affected and the processing load for updating the learning value La can be reduced despite the calculation of the target ignition timing based on the non-updated learning value La.

Even during the ignition timing control according to the third example, the target ignition timing is calculated based on the learning value La updated during the execution of the cylinder-specific air-fuel ratio processing during the execution of the cylinder-specific air-fuel ratio processing that has a relatively long duration of execution. Accordingly, even during the execution of the cylinder-specific air-fuel ratio processing, the output torque of the internal combustion engine can be maintained and the occurrence of knocking can be suppressed at the same time.

Even during the ignition timing control according to the third example, the target ignition timing is calculated based on the learning value L updated by the learning processing in the normal operation state in the normal operation state where the cylinder-specific air-fuel ratio processing is stopped. Accordingly, even immediately after a return to the normal operation state from the ongoing execution of the cylinder-specific air-fuel ratio processing, the target ignition timing that is suitable for the normal operation state is calculated based on the learning value L updated in the normal operation state preceding the execution of the cylinder-specific air-fuel ratio processing. Therefore, the output torque of the internal combustion engine can be maintained and the occurrence of knocking can be suppressed at the same time.

In Step S11a described above, the ECU 50 determines whether or not the state of the engine 20 is immediately after a cold start. For example, the ECU 50 may also determine that the scheduled duration of the cylinder-specific air-fuel ratio processing is relatively short in a case where a regeneration request flag requesting the regeneration of the three-way catalyst 31 is OFF and the scheduled duration of the cylinder-specific air-fuel ratio processing is relatively long in a case where the regeneration request flag is ON. The ECU 50 may also determine that the scheduled duration of the cylinder-specific air-fuel ratio processing is relatively short in a case where the difference between the estimated or measured temperature of the three-way catalyst 31 and a target temperature of the three-way catalyst 31 is equal to or less than a predetermined value and the scheduled duration of the cylinder-specific air-fuel ratio processing is relatively long in a case where the difference exceeds the predetermined value.

The embodiment is not limited to the specific examples that have been described in detail above. The embodiment can be modified and altered in various ways.

In Step S4a of the ignition timing control according to the second and third examples, the occurrence or non-occurrence of knocking is determined by the use of the determination value Da. However, the determination value is not limited to a single one. For example, in the cylinder-specific air-fuel ratio processing, the determination value for determining the occurrence of knocking in the cylinder of which an air-fuel ratio is controlled to be the rich air-fuel ratio may also be a value that differs from the determination value for determining the occurrence of knocking in the cylinder of which an air-fuel ratio is controlled to be the lean air-fuel ratio. The cylinder controlled to have the rich air-fuel ratio and the cylinder controlled to have the lean air-fuel ratio in the cylinder-specific air-fuel ratio processing are determined in advance, and the order of the cylinders in which a combustion stroke is executed is also associated with the crank angle in advance. Accordingly, whether the combustion stroke is by the cylinder controlled to have the rich air-fuel ratio or the cylinder controlled to have the lean air-fuel ratio can be determined, and individual determination values corresponding to the combustion strokes of the respective cylinders can be used. In this case, the target ignition timing is calculated by the control amounts and the learning values being individually updated in the cylinder controlled to have the rich air-fuel ratio and the cylinder controlled to have the lean air-fuel ratio.

In the first to third examples, the knock strength of the engine 20 is detected by the knock sensor 28. For example, the knock strength of the engine 20 may also be calculated based on the value that is detected by an in-cylinder pressure sensor disposed for each cylinder.

In the cylinder-specific air-fuel ratio processing according to the first to third examples described above, the rich air-fuel ratio and the lean air-fuel ratio during the cylinder-specific air-fuel ratio processing are realized by the increase correction or the decrease correction with respect to the fuel injection amount realizing the target air-fuel ratio. For example, the target air-fuel ratio of any one of the cylinders may be set to the rich air-fuel ratio and the target air-fuel ratios of the other cylinders may directly be set to the lean air-fuel ratio during the cylinder-specific air-fuel ratio processing.

What is claimed is:

1. A control device for an internal combustion engine, the control device comprising:
an electronic control unit configured to:
determine whether a cylinder-specific air-fuel ratio processing is being executed, the cylinder-specific air-fuel ratio processing controlling (i) an air-fuel ratio of at least one of a plurality of cylinders of the internal combustion engine to be a rich air-fuel ratio, which is lower than a stoichiometric air-fuel ratio, and (ii) an air-fuel ratio of at least one of the other cylinders of the plurality of cylinders to be a lean air-fuel ratio, which is higher than the stoichiometric air-fuel ratio;
in response to determining that the cylinder-specific air-fuel ratio processing is not being executed, calculate and update a first learning value, which is a difference between a knock strength of the internal combustion engine and a first determination value;
in response to determining that the cylinder-specific air-fuel ratio processing is being executed, prohibit updating of the first learning value;
calculate a target ignition timing of the internal combustion engine based on the first learning value; and
control ignition timing of the internal combustion engine based on the calculated target ignition timing.

2. The control device according to claim 1, wherein:
the electronic control unit is configured, upon determining that the cylinder-specific air-fuel ratio processing is being executed, to update a second learning value in which a result of comparison between the knock strength of the internal combustion engine and a second determination value is reflected; and
the electronic control unit is configured to, upon determining that the cylinder-specific air-fuel ratio processing is being executed, calculate the target ignition timing of the internal combustion engine based on the second learning value.

3. The control device according to claim 2, wherein:
the electronic control unit is configured, upon determining that the cylinder-specific air-fuel ratio processing is being executed, to determine whether a time period scheduled for continuation of the execution of the cylinder-specific air-fuel ratio processing is shorter than a predetermined time period;
the electronic control unit is configured, upon determining that the time period scheduled for the continuation of the execution of the cylinder-specific air-fuel ratio processing is shorter than the predetermined time period, to prohibit updating of the second learning value; and
the electronic control unit is configured, upon determining that the cylinder-specific air-fuel ratio processing is being executed and determining that the time period scheduled for the continuation of the execution of the cylinder-specific air-fuel ratio processing is not shorter than the predetermined time period, to update the second learning value.

4. The control device according to claim 3, wherein the electronic control unit is configured, upon determining that the time period scheduled for the continuation of the execution of the cylinder-specific air-fuel ratio processing is shorter than the predetermined time period, to calculate the target ignition timing based on the second learning value updated when the time period scheduled for the continuation of the execution of the cylinder-specific air-fuel ratio processing is longer than the predetermined time period.

5. A control device for an internal combustion engine, the control device comprising:
an electronic control unit configured to:
- determine whether a cylinder-specific air-fuel ratio processing is being executed, the cylinder-specific air-fuel ratio processing controlling (i) an air-fuel ratio of at least one of a plurality of cylinders of the internal combustion engine to be a rich air-fuel ratio, which is lower than a stoichiometric air-fuel ratio, and (ii) an air-fuel ratio of at least one of the other cylinders of the plurality of cylinders to be a lean air-fuel ratio, which is higher than the stoichiometric air-fuel ratio;
- in response to determining that the cylinder-specific air-fuel ratio processing is not being executed, calculate and update a first learning value, which is a difference between a knock strength of the internal combustion engine and a first determination value;
- in response to determining that the cylinder-specific air-fuel ratio processing is being executed, calculate and update a second learning value, which is a difference between the knock strength of the internal combustion engine and a second determination value;
- in response to determining that the cylinder-specific air-fuel ratio processing is being executed, calculate a target ignition timing of the internal combustion engine based on the second learning value; and
- control ignition timing of the internal combustion engine based on the calculated target ignition timing.

* * * * *